(12) United States Patent
Ward

(10) Patent No.: US 10,858,216 B1
(45) Date of Patent: Dec. 8, 2020

(54) FIRE HOSE HANDLING AND RE-LOADING APPARATUS

(71) Applicant: James Owen Ward, Barre, VT (US)

(72) Inventor: James Owen Ward, Barre, VT (US)

( * ) Notice: Subject to any disclaimer, the term of this patent is extended or adjusted under 35 U.S.C. 154(b) by 0 days.

(21) Appl. No.: 16/599,498

(22) Filed: Oct. 11, 2019

Related U.S. Application Data

(60) Provisional application No. 62/920,787, filed on May 16, 2019.

(51) Int. Cl.
  *B62B 1/04* (2006.01)
  *B65H 75/40* (2006.01)
  *A62C 33/04* (2006.01)

(52) U.S. Cl.
  CPC .......... *B65H 75/403* (2013.01); *A62C 33/04* (2013.01); *B62B 1/04* (2013.01); *B65H 2701/332* (2013.01)

(58) Field of Classification Search
  CPC B62B 1/04; B62B 1/042; B62B 1/208; B62B 1/045; B62B 1/008; B62B 1/10; B62B 1/12; B62B 1/125; B62B 1/264
  USPC ... 280/645, 652, 47.18, 47.19, 47.24, 47.35, 280/79.11
  See application file for complete search history.

(56) References Cited

U.S. PATENT DOCUMENTS

| | | | |
|---|---|---|---|
| 875,476 A | 12/1907 | Wasson | |
| 2,155,769 A * | 4/1939 | Porter | B21C 47/34 242/598.3 |
| 2,155,770 A * | 4/1939 | Porter | B62B 1/264 242/609.3 |
| 2,481,224 A * | 9/1949 | Joswick | B62B 1/12 242/403.1 |
| 2,488,425 A * | 11/1949 | Morrone | B62B 1/10 242/403.1 |
| 2,812,950 A * | 11/1957 | Holloway | B62B 3/009 280/42 |
| 3,168,994 A * | 2/1965 | Grise | A01J 5/00 242/391.2 |
| 3,329,442 A * | 7/1967 | Di Vietri | A45C 13/385 280/35 |
| 3,923,318 A * | 12/1975 | Renard | A45C 13/385 280/35 |

(Continued)

OTHER PUBLICATIONS

Printed Oct. 17, 2019. "RollNRack GoPack—fire hose drainer / loader-Operation—RollNRack System". https://www.youtube.com/watch?v=PvgyOCiz38M. Video published Apr. 26, 2012.

*Primary Examiner* — Jeffrey J Restifo
(74) *Attorney, Agent, or Firm* — Thomas G. Ference

(57) ABSTRACT

An apparatus to handle and relocate rolled fire hose, the apparatus includes a frame, a rotating platform mounted to the frame, a pair of leg members joined by a pivot that splays and retracts the frame, and wheels mounted on the lower portion of each leg. The rotating platform is operable to rotate around an axis perpendicular to the splaying plane created by the legs. The collapsible apparatus, when upright, provides a two tined fork for straddling and lifting the lower perimeter of a rolled fire hose. When tilted rearwards onto the apparatus' wheels, the fork raises the rolled hose off the ground and thus enables "dollying" the rolled hose to any location. When the apparatus is oriented horizontally, the apparatus provides a means for easy, yet controlled uncoiling of the hose roll as the hose is fed to firefighters reloading the hose back onto fire truck's hose bed.

21 Claims, 14 Drawing Sheets

(56) References Cited

U.S. PATENT DOCUMENTS

| | | | | |
|---|---|---|---|---|
| 4,253,716 | A * | 3/1981 | Turner, Jr. | B62B 1/264 206/373 |
| 5,211,351 | A * | 5/1993 | DeClerck | A62C 27/00 137/355.28 |
| 5,275,349 | A * | 1/1994 | Tussing | B65H 49/32 242/557 |
| 5,401,043 | A * | 3/1995 | Myron | B62B 1/125 280/42 |
| 5,509,671 | A * | 4/1996 | Campbell | B62B 1/264 242/557 |
| 5,577,745 | A * | 11/1996 | Birk | B62B 1/12 242/129.5 |
| 5,722,453 | A * | 3/1998 | Huxhold | A62C 33/04 137/355.16 |
| 5,758,685 | A * | 6/1998 | Tisbo | B65H 75/403 137/355.26 |
| 5,931,484 | A * | 8/1999 | Jones | B21C 47/24 280/47.24 |
| 6,095,534 | A * | 8/2000 | Wong | B62B 1/125 135/75 |
| 6,561,449 | B2 * | 5/2003 | Lindermeir | B62B 1/10 137/355.27 |
| 7,232,138 | B2 * | 6/2007 | Shubert | B60P 3/125 280/47.34 |
| 7,661,683 | B2 * | 2/2010 | Fernandez | A62C 33/02 280/47.131 |
| 8,061,722 | B2 * | 11/2011 | Price | B62B 3/02 280/47.18 |
| 8,342,543 | B2 * | 1/2013 | Fernandez | A62C 33/02 280/47.131 |
| 8,403,345 | B2 * | 3/2013 | Iossa | B65H 49/32 242/557 |
| 8,590,825 | B2 * | 11/2013 | Franchini | B65H 75/403 242/403 |
| 8,616,485 | B2 * | 12/2013 | Iossa | B65H 49/32 242/403 |
| 8,727,361 | B2 * | 5/2014 | Jordan | B62B 1/20 242/557 |
| 9,004,391 | B2 | 4/2015 | Fernandez | |
| 9,988,063 | B2 * | 6/2018 | King | B62B 1/12 |
| 10,035,531 | B2 * | 7/2018 | McVay | B62B 3/10 |
| 10,056,729 | B2 * | 8/2018 | Kirst | H01R 43/055 |
| 10,272,935 | B1 * | 4/2019 | Jordan | B62B 1/008 |

* cited by examiner

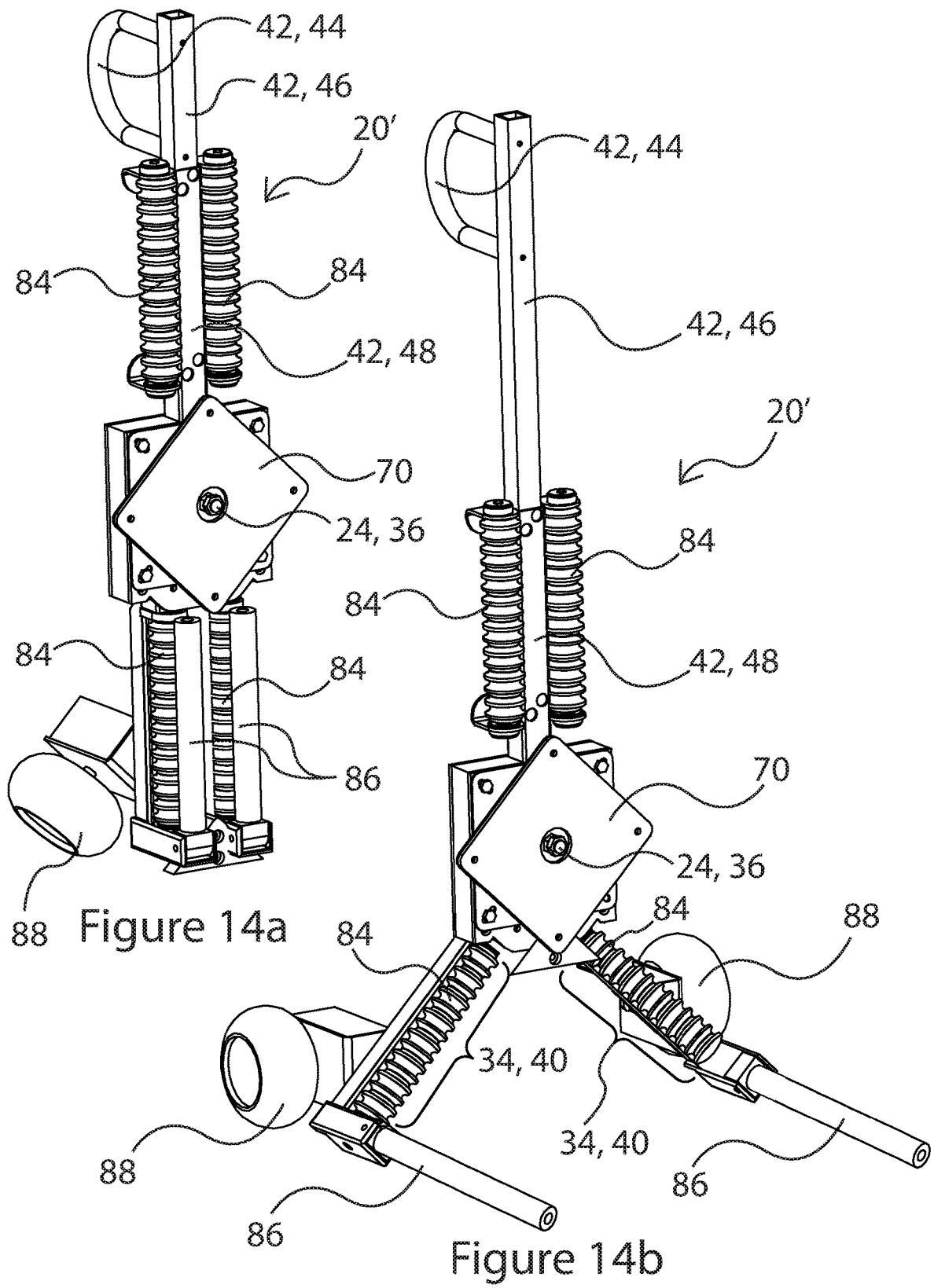

US 10,858,216 B1

FIRE HOSE HANDLING AND RE-LOADING APPARATUS

CROSS-REFERENCE TO RELATED APPLICATIONS

This application claims the benefit of priority of U.S. Provisional Patent Application No. 62/920,787, filed May 16, 2019, which is herein incorporated by reference.

FIELD

The present disclosure generally relates to the handling and transport of a fire hose. More specifically, it relates to an apparatus for handling, maneuvering and reloading rolled fire hose onto a fire truck. The apparatus includes a frame; a rotating platform mounted to the frame; a pair of leg members joined by a pivot that splays and retracts the frame; and wheels mounted on the lower portion of each leg.

BACKGROUND

At every large fire, hundreds of feet of firefighting hose is laid on the ground to move water from various sources, to the seat of the fire for extinguishment of the fire. Certain hose types carry water from fire truck to the fire (called attack lines) while other type hoses carry water from fire hydrants, or other sources of water, to the fire truck (called supply line).

Attack lines are generally 1½", 1¾", or 2½" hoses in 50' lengths. Although other sizes are occasionally used, supply lines are generally 4", 5" or 6" inch and called Large Diameter Hose (LDH). LDH are usually in 100' lengths and can weigh upwards of 100-lbs. or more each. At a large fire, numerous LDH supply lines may be laid successively and total line length can often exceed several hundred or even occasionally one thousand feet, consisting of multiple individual 100' lengths of hose. The 4", 5" and 6" LDH is the primary subject of this disclosure.

After the fire has been extinguished, all of the hose laid needs to be returned to the fire trucks that it originated from, and readied for the next deployment. These tasks are usually performed at the scene of the fire but occasionally the hose is collected on scene and then reloaded onto the fire truck back at the station.

Moving LDH is labor intensive and back-breaking work. Most often, each hose length is rolled on the ground by hand, carried by a single fire fighter back the several hundred feet to the fire truck of origin and then unrolled again. The LDH is then fed by hand up to firefighters positioned on top of the fire truck. The LDH is then reloaded into the fire truck hose bed in a manner that facilitates the hose being self-deployed or laid out again, during the next fire, while the vehicle is in motion. Due to its 100+pound weight, returning the 4", 5", or 6" LDH to service and ready for the next deployment poses the most significant challenge to the already tired firefighters. It is this challenge that this invention primarily addresses.

Previously attempted solutions have focused on hose rolling, or hose dewatering devices, others have focused on wheeled hose carrying and/or hose uncoiling devices. None of these solutions have sufficiently met the most pressing needs of the industry relating to the subject problem. These other devices have fallen short of an effective solution owing to their unwieldy weight and size, being operationally cumbersome, requiring an untenable amount of storage space on the fire truck, and their prohibitively high costs deterring fire departments from owning the multiple units necessary for fire-ground functional efficiency. Multiple units would allow faster reloading of hose as firefighters could be retrieving additional hose rolls with some units while other firefighters were using another unit to reload hose back onto the fire truck.

SUMMARY

In one implementation, the present disclosure is directed to an apparatus for handling hose, the apparatus comprising a frame, a rotating platform mounted to the frame, a pair of leg members joined by a pivot for splaying and retracting the frame. The splaying legs create a splaying plane and the rotating platform is operable to rotate around an axis perpendicular to the splaying plane.

In another implementation, the present disclosure is directed to an apparatus for handling hose, the apparatus comprising a frame, a rotating platform mounted to the front of the frame. The rotating platform is operable to rotating around an axis perpendicular to the front. The frame further includes a pair of tines positioned proximate the rolling end, each tine is located to straddle the outer radius of the hose when the hose is coiled.

In yet another implementation, the present disclosure is directed to an apparatus for handling hose, the apparatus comprising a frame having a front and center, a rotating platform mounted to the front of the frame. The rotating platform is operable to rotating around an axis perpendicular to the front. The frame further includes rollers positioned radially from the center; the rollers rotate independently of the rotating platform.

In still yet another implementation, the present disclosure is directed to an apparatus for handling hose, the apparatus comprising a frame, a rotating platform mounted to the front of the frame. The rotating platform is operable to rotating around an axis perpendicular to the front and wherein the rotating platform telescopes.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 14a is an upright, perspective view of the apparatus for handling hose in accordance with one embodiment of the present invention, the apparatus in a retracted state; and FIG. 14b is an upright, perspective view of the apparatus of FIG. 14a now in a splayed state.

DETAILED DESCRIPTION

Figure 1:
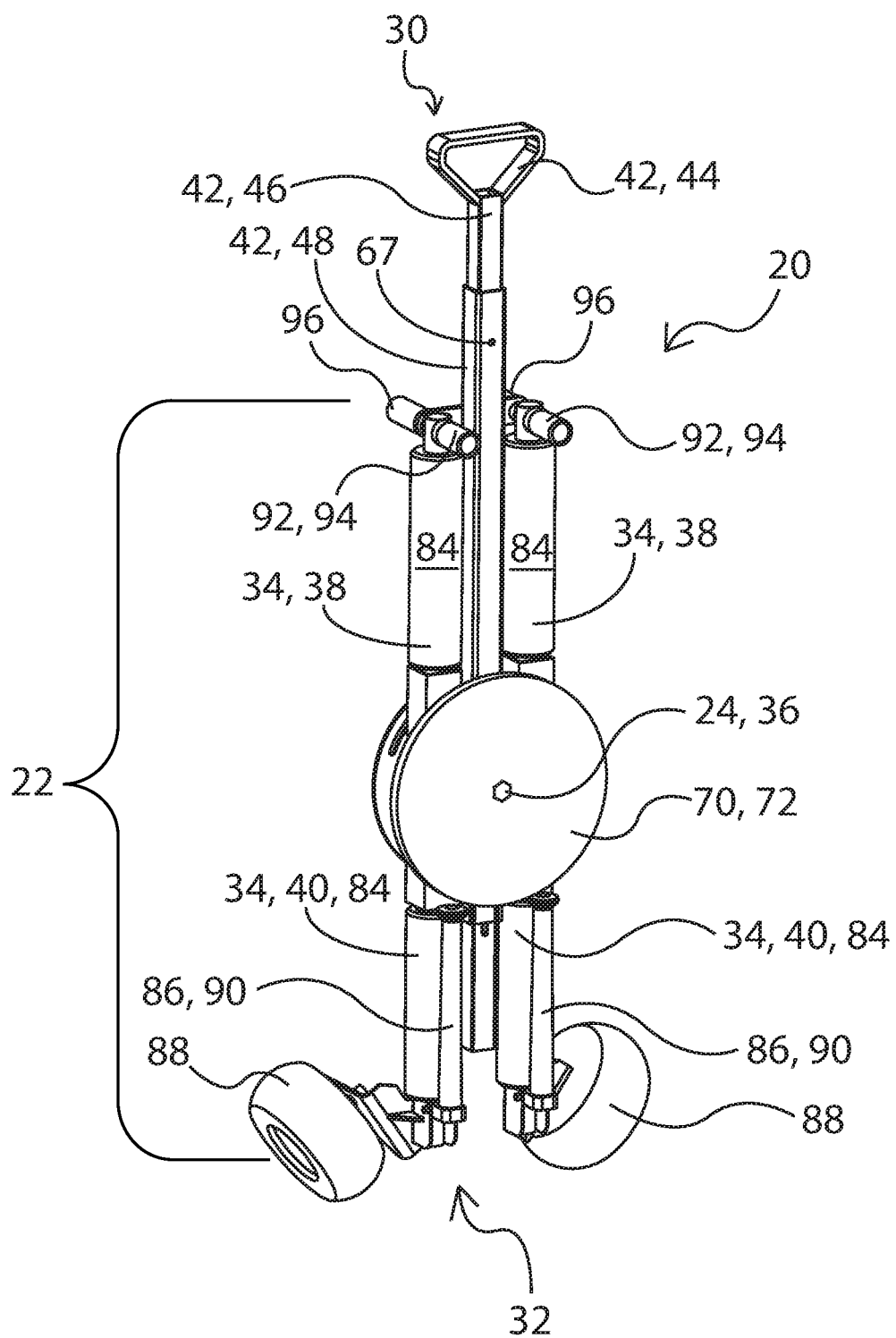
FIG. 1 is an upright, front perspective view of the apparatus for handling hose in accordance with one embodiment of the present invention, the apparatus in a retracted state.
Figure 2:
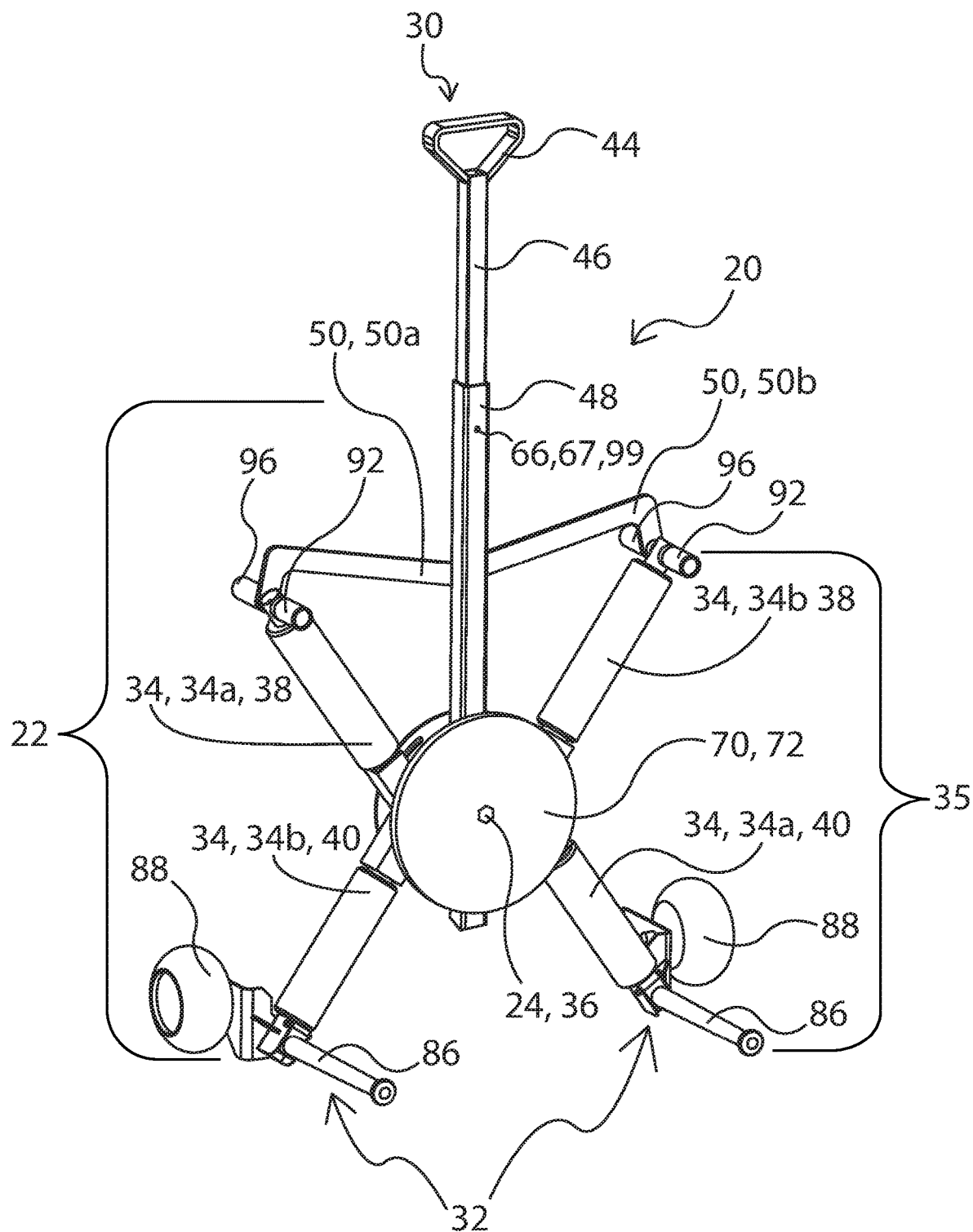
FIG. 2 is an upright, front perspective view of the apparatus of FIG. 1 now in a splayed state.
Figure 3:
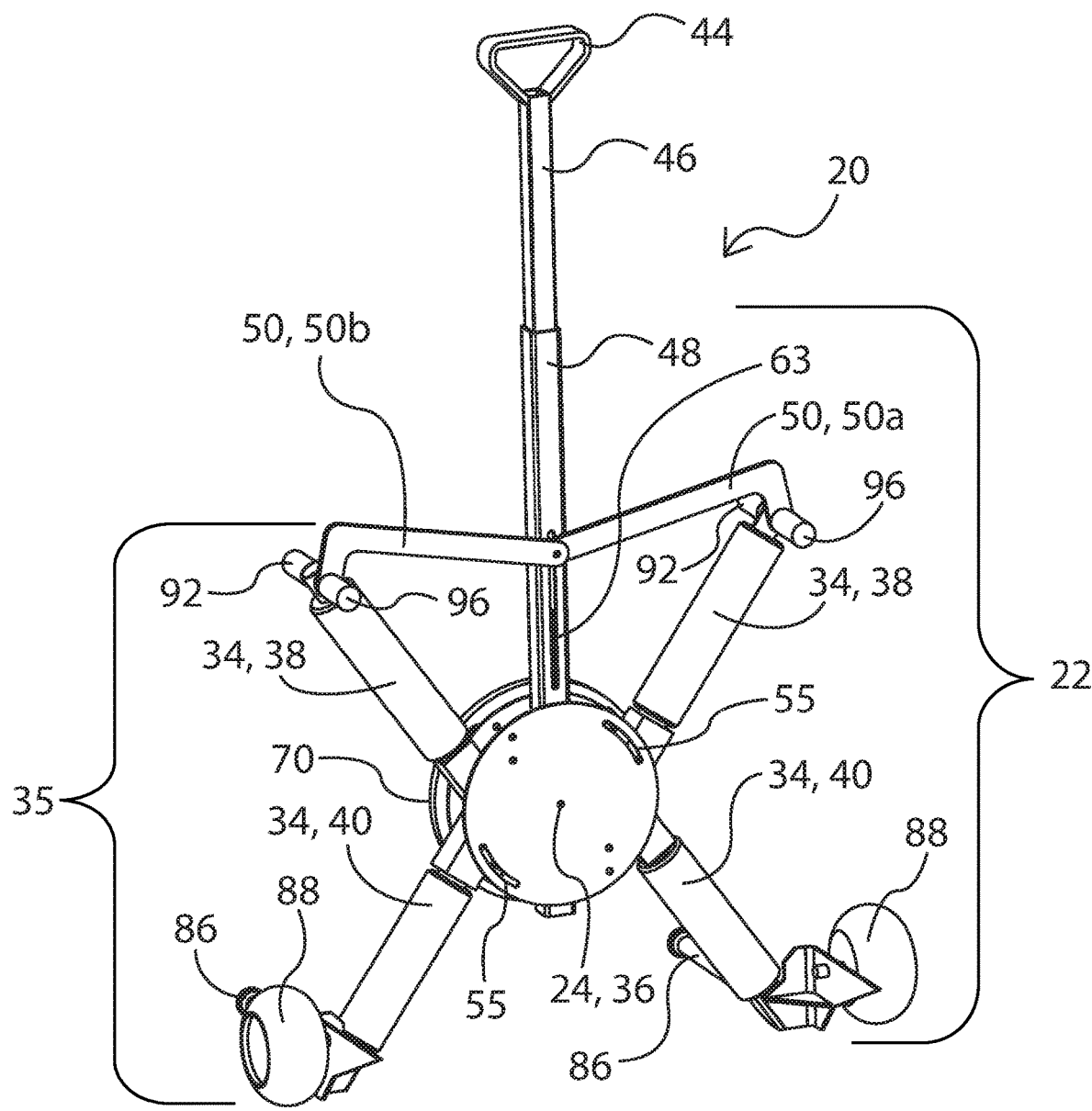
FIG. 3 is an upright, back perspective view of the apparatus of FIG. 1 now in a splayed state.
Figure 4:
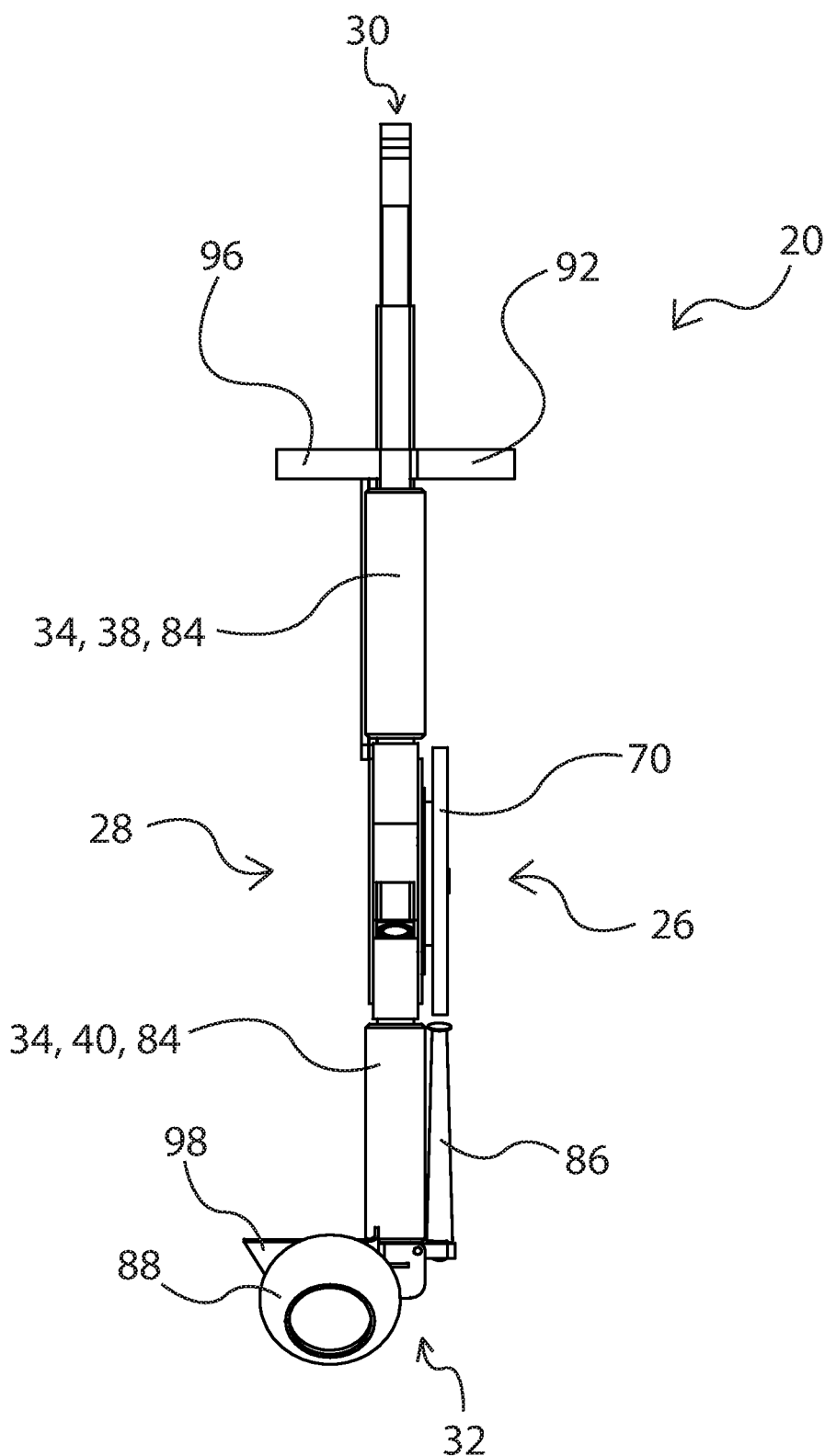
FIG. 4 is a side view of the apparatus in FIG. 1.

Apparatus 20 for handling hose 25 is illustrated in FIGS. 1-14b. Apparatus 20 can move a rolled hose 25 from one point to another over a rolling surface 21 such as the ground, easily maneuver around obstacles, and facilitates feeding hose to firefighters reloading the hose onto a fire truck 100. Apparatus 20 comprises a frame 22. Frame 22 has a center 24, front 26, back 28, holding end 30 and rolling end 32. Frame 22 is preferably an expandable and contractible frame. Frame 22 includes a pair of leg members 34 (34a and 34b) joined by a pivot 36. Pivot 36 is substantially at the center of the frame. In one embodiment, each leg member 34 has a superior portion 38 and an inferior portion 40, FIGS. 1-6b and 8-13. In another embodiment, leg members 34 may only have an inferior portion 40, apparatus 20', FIGS. 14a and 14b. Leg members 34 may telescope for greater compactness. In the preferred embodiment, both the superior portions 38 and inferior portions 40 are present and create a collapsible "X". Together leg members 34 and pivot 36 create cross-leg members 35 that splay apart and retract around pivot 36. Splaying and retraction of the leg members expands and collapses frame 22 and therefore expands and collapses apparatus 20. The movement of leg members 34 defines a splaying plane 37, FIG. 5. Leg members 34 may further be telescoping leg members where the length of the superior portions 38 and inferior portions 40 may be adjusted. Frame 22 may be fabricated from aluminum, steel, plastic or any other rigid strong material. In the retracted state, FIG. 1, apparatus 20 is compact and ready for storage. In the splayed state, FIGS. 2 and 3, apparatus 20 is ready for holding, moving and uncoiling hose 25.

Apparatus 20 further includes a handle 42 integrated with frame 22 at holding end 30. Handle 42 dissects the intersection of leg members 34 at the location of pivot 36 and provides a means of pushing or pulling apparatus on wheels 88 when deployed. Handle 42 is preferably a telescoping handle that provides additional compactness to the apparatus as well as provides a mechanism to aid in the splaying of leg members 34. Handle 42 has a grasping member 44 attached to handle extension member 46 that slides along a handle receptacle 48. Apparatus 20 further includes linking arms 50 (50a and 50b). Linking arms 50 engage between handle 42 and superior portions 38 of cross-leg members 35. When handle extension 46 is telescoped outward to lengthen handle 42, linking arms 50 cause cross-legged members 35 to splay apart and widen frame 22. When handle extension 46 is telescoped inward to shorten handle 42, linking arms 50 retract cross-legged members 35 to retract and collapse frame 22 so that the frame is more compact.

Figure 5:
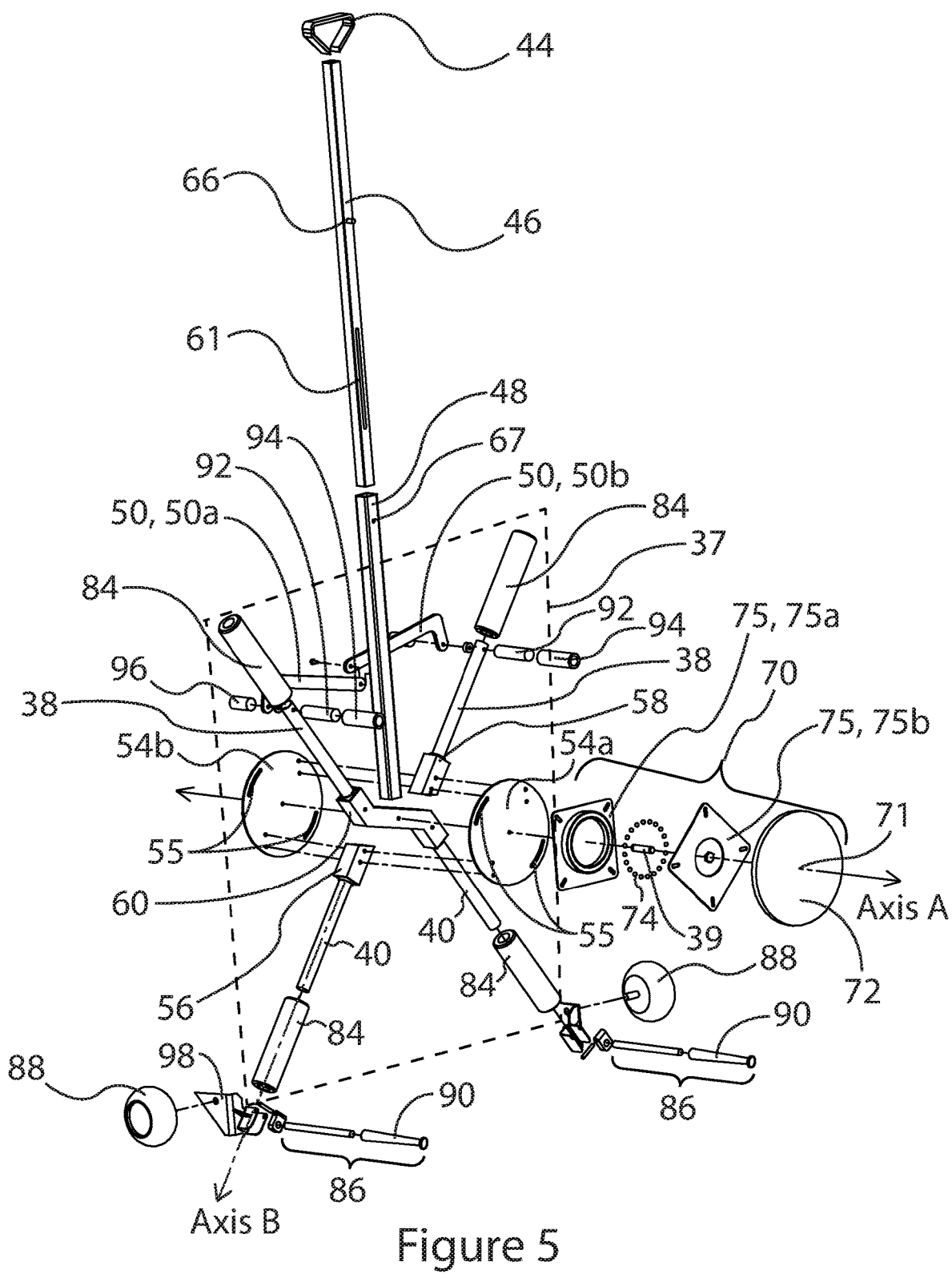
FIG. 5 is an exploded view of the apparatus in FIG. 2.
Figure 6A:
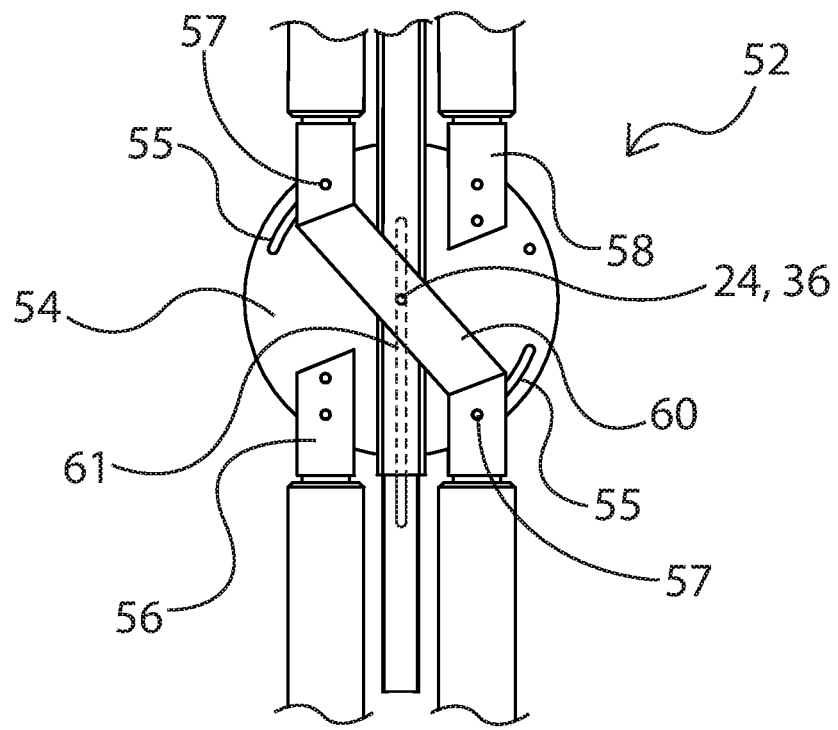
FIG. 6a is an internal detail view of one embodiment of a splaying mechanism used in conjunction with the apparatus of FIG. 1, the splaying mechanism in a retracted state.
Figure 6B:
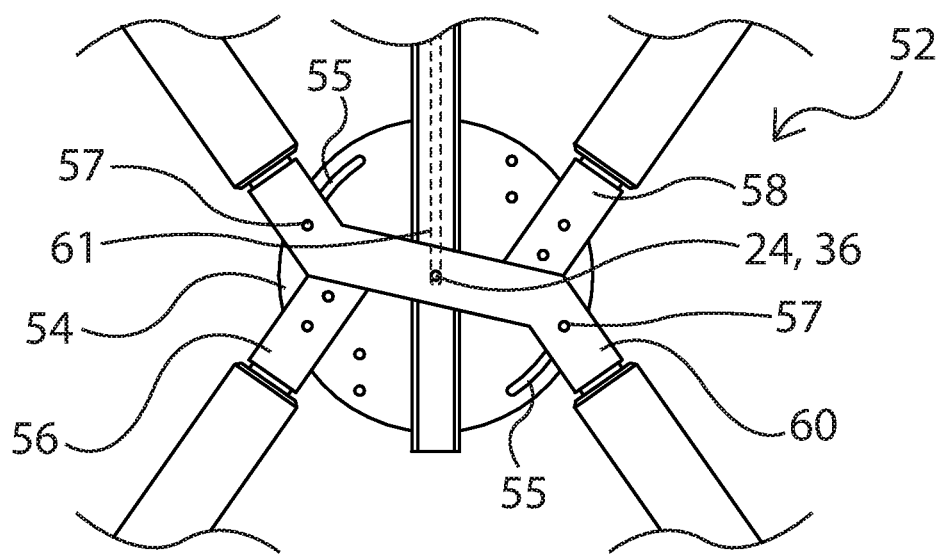
FIG. 6b is an internal detail view of the splaying mechanism of FIG. 6a, the splaying mechanism now in a splayed state.
Figure 7A:
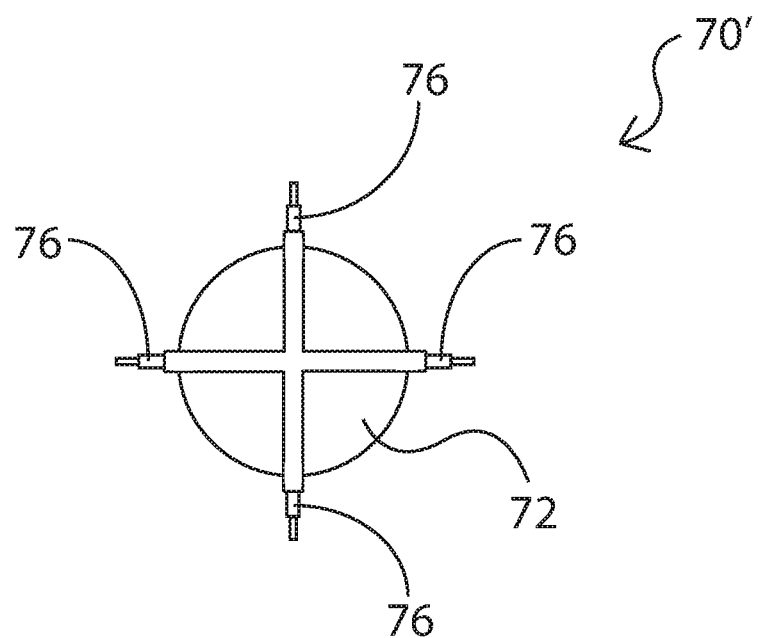
FIG. 7a is front view of a telescoping rotating platform that may be used as one embodiment of the rotating platform of the apparatus in FIG. 1, the telescoping rotating platform in a contracted state.
Figure 7B:
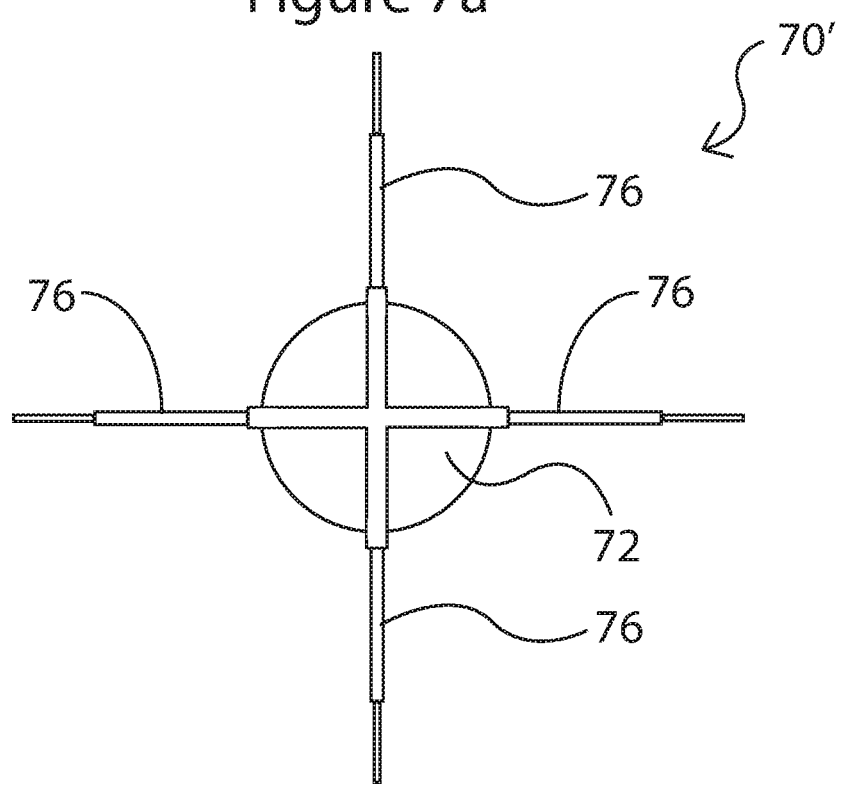
FIG. 7b is front view of a telescoping rotating platform of FIG. 7a, the telescoping rotating platform now in an expanded state.
Figures 8A, 8B, 8C:
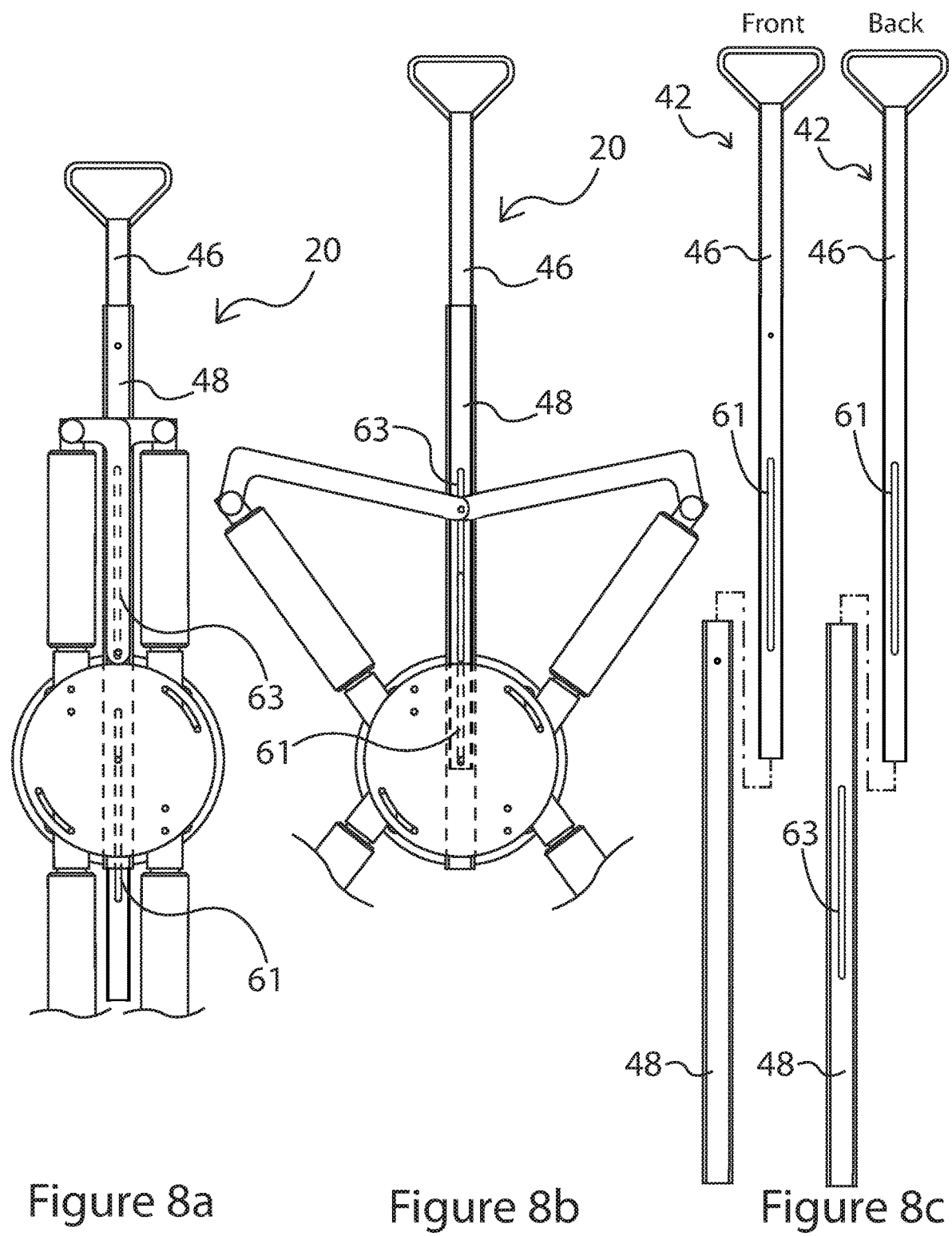
FIG. 8a is a backside view of the telescoping handle used in conjunction with the apparatus of FIG. 1, the handle in a contracted state.
FIG. 8b is a backside view of the telescoping handle used in conjunction with the apparatus of FIG. 8a, the handle in a telescoped state.
FIG. 8c is an exploded front and back view of the telescoping handle components used in conjunction with the apparatus of FIG. 1.
Figure 9:
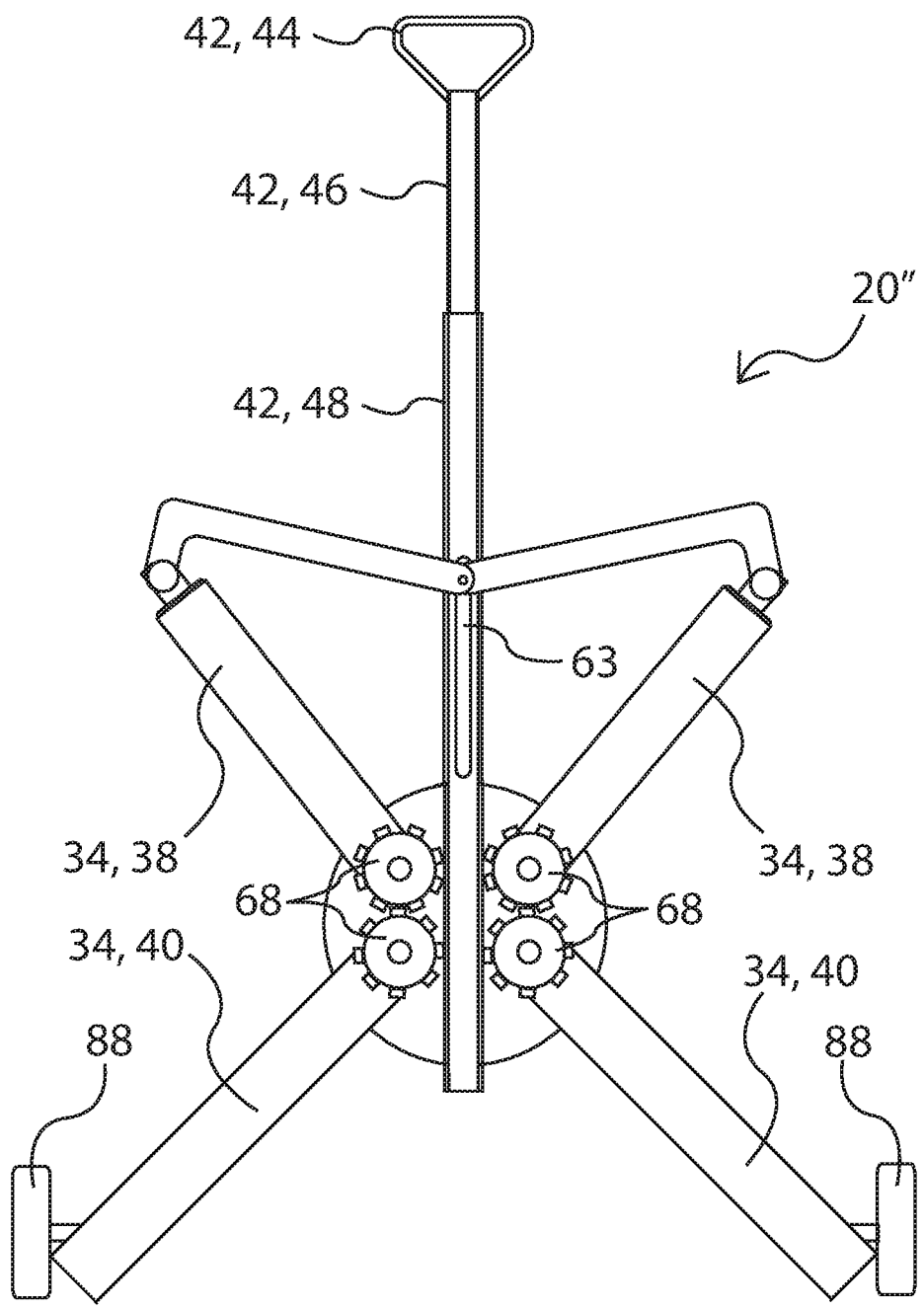
FIG. 9 is a back, internal detail view of one embodiment of a splaying mechanism used in conjunction with the apparatus of FIG. 1, the splaying mechanism in a splayed state.
Figure 10A:
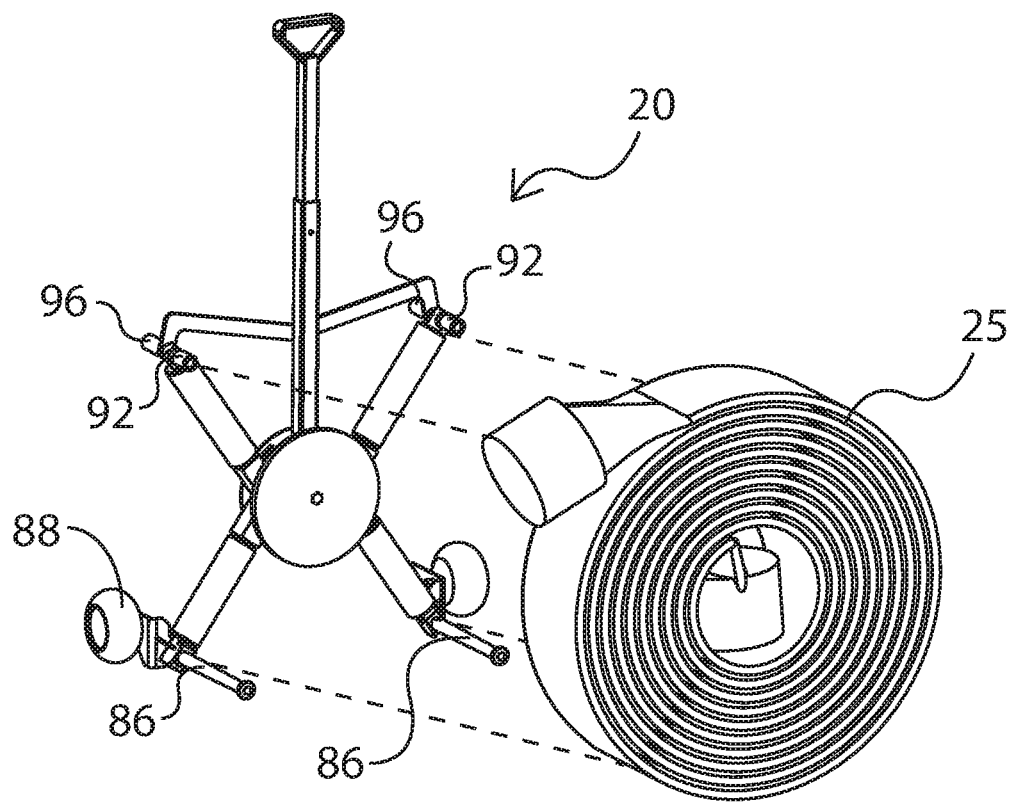
FIG. 10a is an upright, perspective view of the apparatus of FIG. 2 being positioned for engaging a coiled hose.
Figure 10B:
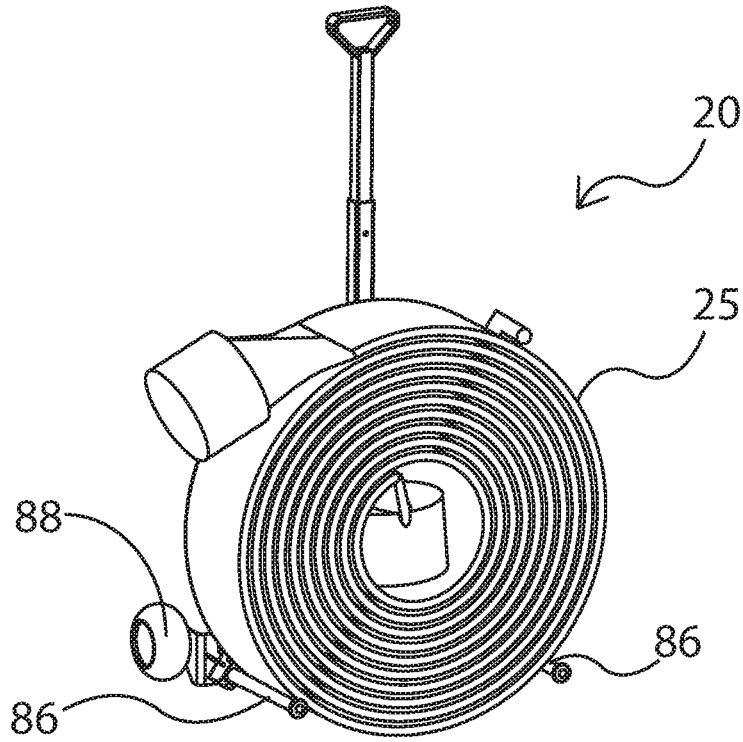
FIG. 10b is an upright, perspective view of the apparatus of FIG. 10a now engaged to lift the coiled hose.
Figure 11:
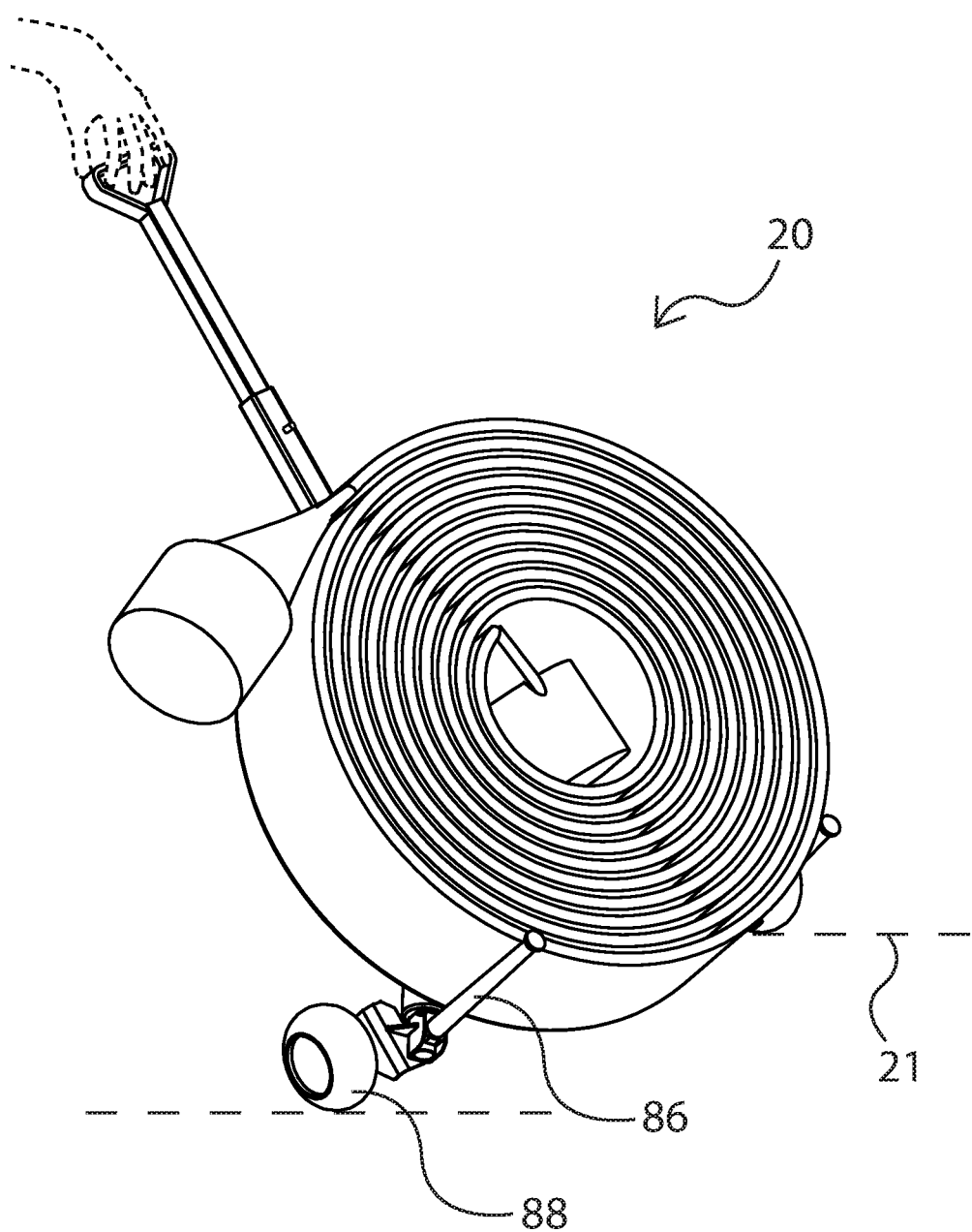
FIG. 11 is an upright, perspective view of the apparatus of FIG. 10b now tilted backward and rolling on the wheels to relocated the hose.
Figure 12:
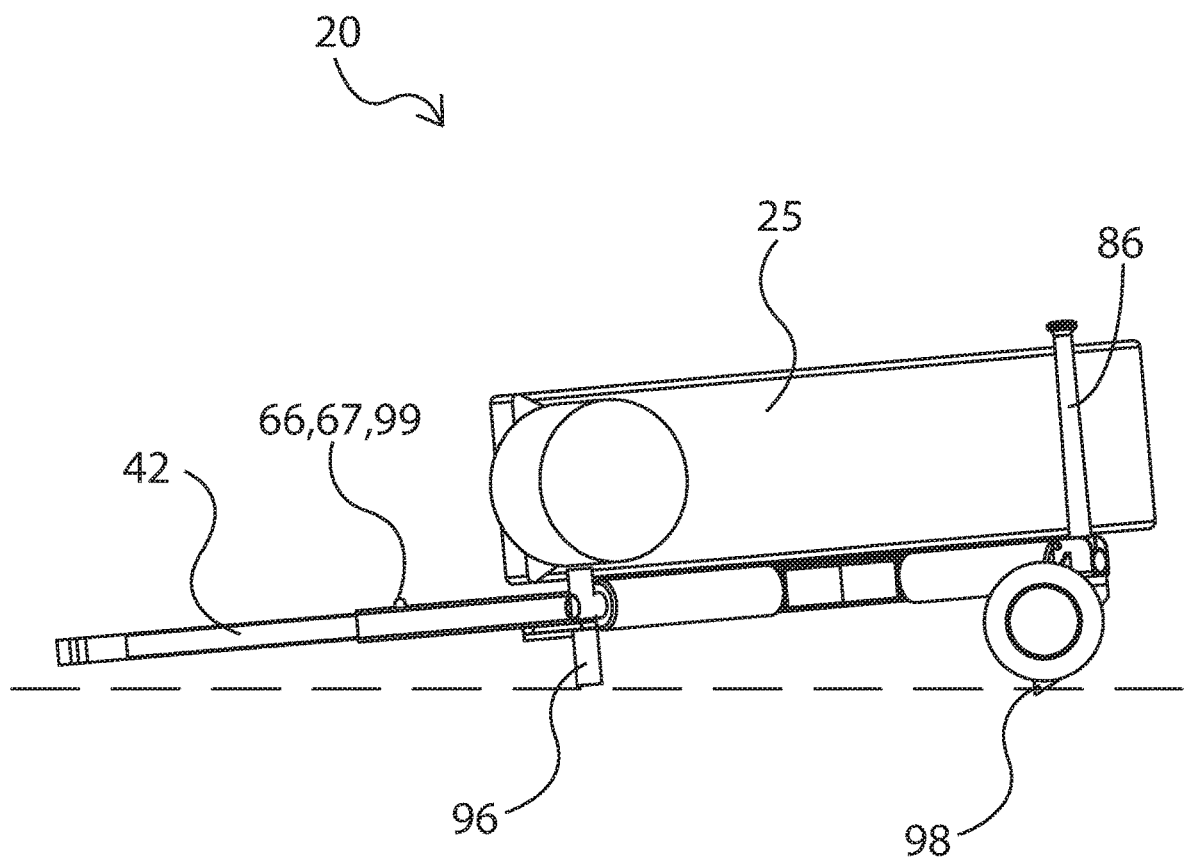
FIG. 12 is a side view of the apparatus of FIG. 11 now positioned horizontally upon the ground.
Figure 13:
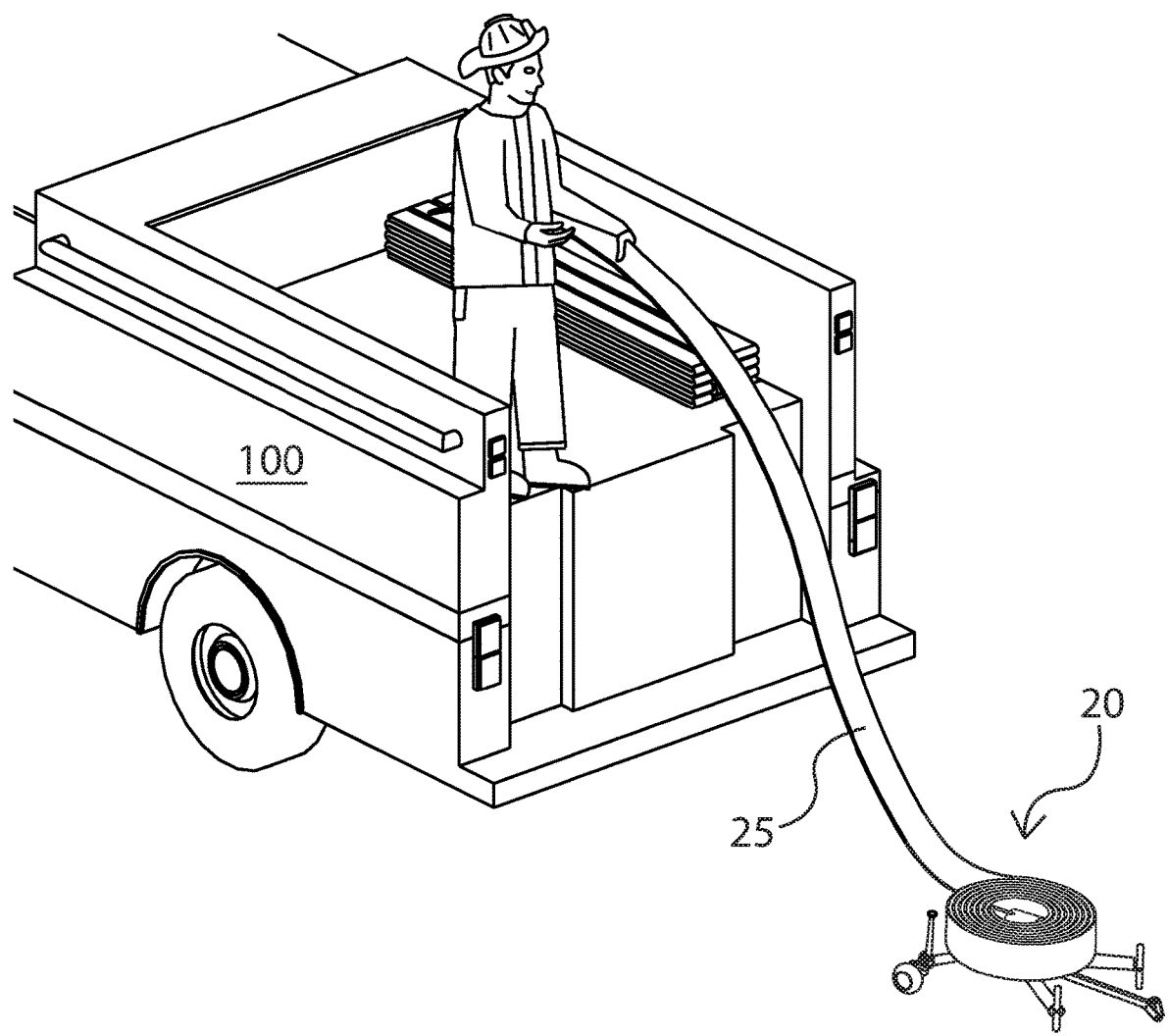
FIG. 13 is a perspective view of the apparatus of FIG. 12 in a reclined state being used to uncoil hose for reloading back onto the fire truck.

In one embodiment, FIGS. 5, 6a and 6b splaying mechanism 52 includes two circular flat metal plates 54a and 54b, inferior portion receptacle 56, superior portion receptacle 58, combination inferior/superior receptacle 60, handle extension 46 and handle receptacle 48. The inferior portion receptacle 56 and superior portion receptacle 58 are sandwiched between and fastened to circular plates 54a and 54b. Being sandwiched and affixed between circular plates 54a and 54b; inferior portion receptacle 56, superior portion receptacle 58 and both circular plates are static, relative to each other, and move in unison as a singular part. The remaining combination inferior/superior receptacle 60 has an offset jog and is sandwiched, but not fastened, between circular metal plates 54a and 54b. Combination inferior/superior receptacle 60 moves dynamic relative to the two circular plates 54a and 54b, and the combination inferior/superior receptacle is able to pivot around pivot 36 that includes a pivot pin 39.

Splaying mechanism 52 enables each leg receptacle, and thus each leg, to move in unison with its vertically opposing counterpart leg receptacle and respective leg on the opposite lateral side of the device. Handle receptacle 48 passes through the center of the combination inferior/superior receptacle 60 on the same plane as the leg receptacles. Circular plates 54a and 54b may have rotation slots 55. A rotation limit pin 57 may be mounted to run between the two circular plates and fastened to the combination inferior/superior receptacle 60 to limit rotation of the cross-leg members 35.

Handle 42 and splaying mechanism 52 are designed to work together so that extending or contracting the handle splays or contracts the cross-leg members 35, FIGS. 6a, 6b and 8a-c. For this to work, a through-slot 61 is provided in handle extension 46 and a linkage slot 63 in handle receptacle 48. Handle extension 46 is dynamic and handle receptacle 48 is fixed. Through-slot 61 is located at the lower end of handle extension 46, the slot open from the front to back. When handle extension 46 is positioned within handle receptacle at center 24 of apparatus 20, handle extension 46 is allowed to travel a fixed distance in spite of being penetrated through the through-slot 61 by the center pivot pin at pivot 36. Linkage slot 63 is a slot in the backside of handle receptacle 48. The linking arms 50 are affixed at a specific point to handle extension 46, that point of attachment is allowed to move through linkage slot 63. As handle extension 46 moves within handle receptacle 48, linking arms 50 fastened to the handle extension, slide alone the length of linkage slot 63.

Handle extension 46 is used to activate the splaying mechanism. Extending handle extension 46 moves linking arms 50 to be more perpendicular to the handle and thus moves the superior portions 38 apart splaying the legs. Similarly retracting handle extension 46 moves the linking arms to lay more parallel to the handle and contracts the superior portions 38. A means of locking the telescoping handle in the desired positions is provided by locking device 99. Locking device 99 may be a spring button 66 to fit within a spring button hole 67, a spring loaded pin or a friction point lever. Linking arms 50 could also be elongated to form an over-center eccentric toggle lock. In an alternative embodiment 20", leg splaying and contracting is provided by gears 68, FIG. 9, at the innermost end of inferior portions 40 meshing with gears 68 at the innermost ends of the superior portions 38 rather than a center pivot.

A rotating platform 70 is mounted to frame 22. Rotating platform 70 is operable to rotate around axis A (a.k.a. platform rotation axis, a.k.a. pivot axis) that is perpendicular to splaying plane 37. Rotating platform 70 has a platform center 71, the platform center is mounted to the pivot 36. Rotating platform 70 is operable to rotate 360-degrees around the pivot axis independent of pair of leg members 34. Rotating platform 70 acts both as a support when transporting coiled hose 25 and also as a mechanism that facilitates easy uncoiling of rolled hose 25 back onto the fire truck. Rotating platform 70 includes a circular disc 72 mounted onto turntable bearings 74 that are sandwiched between two raceways 75 (75a and 75b). Raceways 75a and 75b rotate relative to each other over bearings 74 allowing rotating platform 70 to rotate. Rotating platform 70 may also be telescoping rotating platform 70', FIGS. 7a and 7b. In one embodiment telescoping platform 70' has four extension arms 76 that telescope outward from the center providing additional support for a coiled hose and also compactness for storage.

Additional components and features of apparatus 20 may be provide in conjunction with rotating platform 70 to further enhance support and easy, controlled uncoiling of hose 25. When splayed, the superior portions 38 and inferior portions 40 of leg members 34 can be used to support the outer radius of a coiled hose. By adding a rotatable leg surface 84 to each superior portion 38 and inferior portion 40, coiled hose 25 can then rotate over these surfaces while still being supported. Rotatable leg surface 84 is preferably a circumferential sleeve, cylindrical roller, or plurality of rollers. The roller's independent rotation is rotation around a Axis B (a.k.a. roller axis) that is perpendicular to the pivot axis of rotation. In an alternative embodiment cylindrical rollers may be fastened to sides or tops of legs or combination of both. In another alternative embodiment a plurality of circumferential grooves may be provided on the circumferential sleeve or rollers. In still another alternative embodiment a plurality of cylindrical rollers are provided radially from the center. In still yet another embodiment a plurality of rollers are provided circumferentially grooved or un-grooved on each leg.

Near the posterior end of each inferior portion 40 of leg member 34 is a tine 86. Tine 86 is an elongated protrusion that may take the form of an elongated cylinder or elongated rod. Tine 86 is preferably pivotably connected to the inferior portion 40 to pivot between a position parallel to and perpendicular to the splaying plane 37. In the splayed state each tine is located to straddle the outer radius of a coiled hose. When upright, in the vertically deployed position, the two folding tines 86 create a "fork" on the lowermost anterior aspect of frame 22, FIG. 2. Tines 86 are used to lift coiled hose 25 off of the ground when apparatus 20 is tilted backward onto wheels 88. Each tine 86 preferably has a rotating tine surface 90 to aid in the uncoiling of the hose from apparatus 20. As hose 25 is being unloaded, the hose easily rolls past tines 86. Tines 86 help to keep the hose on rotating platform 70 during uncoiling. Each tine 86 may have a tapered shaft that narrows towards the free end with an enlarged free end to help hold hose 25 in place when the hose is being uncoiled from apparatus 20.

The upper end of each superior portion 40 of leg 34 may include a bumper 92. In the splayed state each bumper is located to straddle the outer radius of a coiled hose. Bumper 92 extends perpendicular from leg member 34 to provide a revolving upper, perimeter bumper or "stop" to counter balance the "Fork" tines during uncoiling. Each bumper is preferably has a rotating bumper surface 94 to aid in the uncoiling of the hose from apparatus 20. As hose 25 is being uncoiled, the hose easily rolls past bumper 92. Bumpers 92 help to keep the hose on rotating platform 70 during uncoiling.

At the outermost end of each of superior portion 40 on the back side is a standoff 96. Standoff 96 is a protrusion that when the backside of the frame is laid upon the ground, i.e. rolling surface 21, the standoff keeps handle 42 from touching the ground. Standoffs 96 create two contact points with the ground surface that help support apparatus 20 in a reclined/horizontal position so that the apparatus does not move, wheels do not roll, when unloading a hose.

Inferior portion 38 of each leg member 34 having a revolving wheel 88 and tire fastened on the lateral aspect of the outermost end. Wheels 88 are used to move apparatus 20 along the rolling surface such as the ground when the apparatus is between a vertical and reclined state. When the inferior portion 38 of each leg is splayed, wheels 88 are positioned to roll around an axis parallel to the rolling surface.

Rigid protrusion 98 is provided adjacent to each wheel 88. Rigid protrusion 98 protrudes from apparatus frame 20 in a direction away from and generally perpendicular to the back of the frame as well perpendicular to the spinning axis of each wheel 88. Rigid protrusion 98 extends to points slightly beyond the outer most circumferential edge of each of wheels 88. When apparatus 20 is in the vertical deployment position, as for moving hose, FIGS. 2-4, 10a-10b and 11, ridged protrusions 98 are not in contact with the rolling surface. However when apparatus 20 is pivoted rearward into the horizontal deployment position, FIG. 12, as for hose uncoiling, the outer most ends of the rigid protrusions 98 make contact with the rolling surface and elevate wheels 88 from the rolling surface. This interruption of wheels 88 contact with rolling surface 21 prevents the apparatus from rolling on the wheels during uncoiling.

Apparatus 20 is deployed as follows. From the retracted state, FIG. 1, handle extension 46 is pulled causing linking arms 50 that are attached between superior portions 38 to splay leg members 34. Handle 42 is then locked in place by a locking mechanism 99. Apparatus 20 is then wheeled into proximity of a rolled fire hose 25 that has been positioned upright and vertical upon the ground. Tines 86 are then pivoted outward perpendicular to leg members 34 to create a fork, FIG. 10a. Tines 86 are then slid under the near outer most aspect of where the circumference of a rolled fire hose contacts the rolling surface, FIG. 10b. When apparatus 20 is tilted in a rearward direction, and allowed to pivot on wheels 88, the apparatus lifts the rolled hose 25 from the ground and enables the movement of the hose roll to a new desired location, FIG. 11. If hose 25 is to be reloaded back onto a fire truck 100, the hose is rolled into proper proximity to the awaiting fire truck that the hose is to be re-loaded onto. Apparatus 20 with rolled hose 25 is then laid down, in a rearward direction, onto the ground such that the standoffs 96 and protrusions 98 are resting on the ground and the hose is oriented horizontally, FIG. 12. The coiled hose 25, now laying centered on rotating platform 70 is now in a position to be hand fed to firefighters loading the hose onto the hose bed of the fire truck. As the firefighter pulls on hose 25, the hose roll rotates with rotating platform 70 and rotatable leg surfaces 84 as the hose is advanced, FIG. 13. Bumpers 92 and tines 86 keep the hose from sliding off of rotating platform 36.

FIGS. 14*a* and 14*b* show an alternative embodiment where leg members 34 of apparatus 20' may only have an inferior portion 40. Apparatus 20' may have all the other features discussed above as they relate to apparatus 20 which has leg members 34 with both an inferior portion 40 and a superior portion 38.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. An apparatus for handling hose, comprising:
   a) a frame having a front, back, holding end and a rolling end;
   b) a pair of leg members joined by a pivot for splaying and retracting the frame; wherein each leg includes an inferior portion;
   c) a rotating platform having a platform center, the platform center mounted to the pivot and
   d) wherein the legs splay to create a splaying plane, wherein the pivot has a pivot axis of rotation perpendicular to the splaying plane, wherein the rotating platform is operable to rotate 360-degrees around the pivot axis independent of the pair of leg members.

2. The apparatus as recited in claim 1, wherein the leg members are cross-leg members, wherein each leg includes a superior portion and the inferior portion.

3. The apparatus as recited in claim 2, wherein superior portions laying within the splaying plane have a rotating outer surface.

4. The apparatus as recited in claim 2, wherein each superior portion has a standoff foot on the back.

5. The apparatus as recited in claim 2, wherein each superior portion has a bumper on the front.

6. The apparatus as recited in claim 5, wherein each bumper has a rotating outer surface.

7. The apparatus as recited in claim 1, further including a handle at the holding end.

8. The apparatus as recited in claim 7, wherein the handle is a telescoping handle including an extension member sliding along a handle receptacle.

9. The apparatus as recited in claim 1, wherein each inferior portion includes a wheel.

10. The apparatus as recited in claim 9, wherein when the inferior ends are splayed the wheels are positioned to roll around an axis perpendicular to the pivot axis.

11. The apparatus as recited in claim 9, further comprising a rigid protrusion on the back of the inferior portions that lifts the wheels off a rolling surface when the back of the frame is laid upon the rolling surface.

12. The apparatus as recited in claim 1, wherein each inferior portion includes a tine perpendicular to the plane of the frame.

13. The apparatus as recited in claim 12, wherein each tine is located to straddle the outer radius of a coil of the hose when the hose is coiled.

14. The apparatus as recited in claim 12, wherein each tine has a rotating outer surface.

15. The apparatus as recited in claim 12, wherein each tine has a tapered shaft that narrows towards the free end, wherein the free end has an overhanging lip.

16. The apparatus as recited in claim 12,
   wherein the tine is pivotably connected to each inferior portion to pivot between a position parallel to and perpendicular to the splaying plane.

17. The apparatus as recited in claim 1, wherein inferior portions have a rotating outer surface.

18. The apparatus as recited in claim 1, further comprising a first plate and a second plate centered on the pivot, one plate on each side of the leg members.

19. The apparatus as recited in claim 1,
   wherein the frame includes rollers positioned radially from the center, wherein the rollers have independent rotation from the rotating platform, wherein the roller's independent rotation is rotation around a roller axis that is perpendicular to the pivot axis of rotation.

20. An apparatus for handling hose, comprising:
   a) a frame having a front, back, holding end and rolling end;
   b) a handle mounted to the holding end of the frame;
   c) a rotating platform mounted to the frame;
   d) a pair of splaying cross-leg members joined by a pivot for splaying and retracting the frame, wherein each leg includes an inferior portion and a superior portion; wherein the legs create a splaying plane, wherein the rotating platform is operable to rotate around an axis perpendicular to the splaying plane; and
   e) linking arms engaged between the handle and superior portions of the leg members, wherein the handle telescopes to move the linking arms to splay and retract the frame.

21. An apparatus for handling hose, comprising:
   a) a frame having a front, back, holding end and rolling end;
   b) a rotating platform mounted to the frame, wherein the rotating platform includes a rotation plate mounted onto a turntable bearing;
   c) a pair of leg members joined by a pivot for splaying and retracting the frame, wherein each leg includes an inferior portion; and
   d) wherein the legs splay to create a splaying plane, wherein the rotating platform is operable to rotate around an axis perpendicular to the splaying plane.

* * * * *